(12) United States Patent
Okada et al.

(10) Patent No.: US 8,872,775 B2
(45) Date of Patent: Oct. 28, 2014

(54) INFORMATION PROCESSING APPARATUS

(75) Inventors: Takashi Okada, Tokyo (JP); Yukiko Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 13/123,943

(22) PCT Filed: Oct. 22, 2009

(86) PCT No.: PCT/JP2009/005532
§ 371 (c)(1),
(2), (4) Date: Apr. 13, 2011

(87) PCT Pub. No.: WO2010/050154
PCT Pub. Date: May 6, 2010

(65) Prior Publication Data
US 2011/0201301 A1    Aug. 18, 2011

(30) Foreign Application Priority Data

Oct. 27, 2008  (JP) ................ 2008-275068
Oct. 27, 2008  (JP) ................ 2008-275705

(51) Int. Cl.
G06F 3/041    (2006.01)
G06F 3/0488   (2013.01)
H04M 1/66     (2006.01)
H04M 1/725    (2006.01)
H04M 1/02     (2006.01)
H04M 1/60     (2006.01)
H04M 1/663    (2006.01)
H04M 1/67     (2006.01)
H04W 52/02    (2009.01)

(52) U.S. Cl.
CPC .......... G06F 3/0416 (2013.01); G06F 3/04886 (2013.01); H04M 1/66 (2013.01); H04M 1/72583 (2013.01); H04M 1/0245 (2013.01); H04M 1/6041 (2013.01); H04M 1/663 (2013.01); H04M 1/67 (2013.01); H04M 2250/16 (2013.01); H04M 2250/22 (2013.01); H04W 52/027 (2013.01)
USPC ............. 345/173; 345/156; 345/174; 455/48; 455/404.1; 455/566

(58) Field of Classification Search
CPC ....... G06F 3/017; G06F 3/048; G06F 3/0482; G06F 3/0488; G06F 3/04886
USPC .......... 345/173, 156, 174; 455/48, 404.1, 566
See application file for complete search history.

(56) References Cited

U.S. PATENT DOCUMENTS

2007/0150826 A1  6/2007  Anzures et al.
2008/0188267 A1* 8/2008  Sagong ........................ 455/566
2009/0160802 A1* 6/2009  Yasumi ........................ 345/173

FOREIGN PATENT DOCUMENTS

CN    101237636 A    8/2008
EP    1555796 A1     7/2005
(Continued)

OTHER PUBLICATIONS

International Search Report for PCT/JP2009/005532 mailed Dec. 1, 2009.

(Continued)

*Primary Examiner* — William Boddie
*Assistant Examiner* — Saifeldin Elnafia
(74) *Attorney, Agent, or Firm* — Sughrue Mion, PLLC

(57) ABSTRACT

An information processing apparatus of the present invention includes a touch panel for displaying predetermined information and accepting a touch operation input; and a control section for controlling operation of the information processing apparatus itself having the touch panel installed therein. The control section includes a processing occurrence detection means for detecting occurrence of a predetermined processing executed by the control section; and a panel control means for nullifying a touch operation input against the touch panel when the occurrence of the predetermined processing is detected by the processing occurrence detection means. The panel control means cancels nullification of the touch operation input against the touch panel after an elapse of a preset time from the occurrence of the predetermined processing, and sets, in association with the occurred predetermined processing, a touch operation input acceptable range allowing the touch panel to accept the touch operation input with respect to the predetermined processing.

12 Claims, 14 Drawing Sheets

(56) References Cited

FOREIGN PATENT DOCUMENTS

| | | |
|---|---|---|
| EP | 1956809 A2 | 8/2008 |
| JP | 3-102950 A | 4/1991 |
| JP | 9-321830 A | 12/1997 |
| JP | 2000349886 A | 12/2000 |
| JP | 2003179678 A | 6/2003 |
| JP | 2004159028 A | 6/2004 |
| JP | 2005130278 A | 5/2005 |
| JP | 2005203930 A | 7/2005 |
| JP | 2006-115043 A | 4/2006 |
| JP | 2007235676 A | 9/2007 |

OTHER PUBLICATIONS

Chinese Office Action for CN200980142977.4 issued on Apr. 11, 2013 with English Translation.

Japanese Office Action for JP Application No. 2010-535645 mailed on Aug. 6, 2013 with Partial English Translation.

Extended European Search Report issued Aug. 20, 2014 in European Patent Application No. 09823268.

* cited by examiner

Fig.9
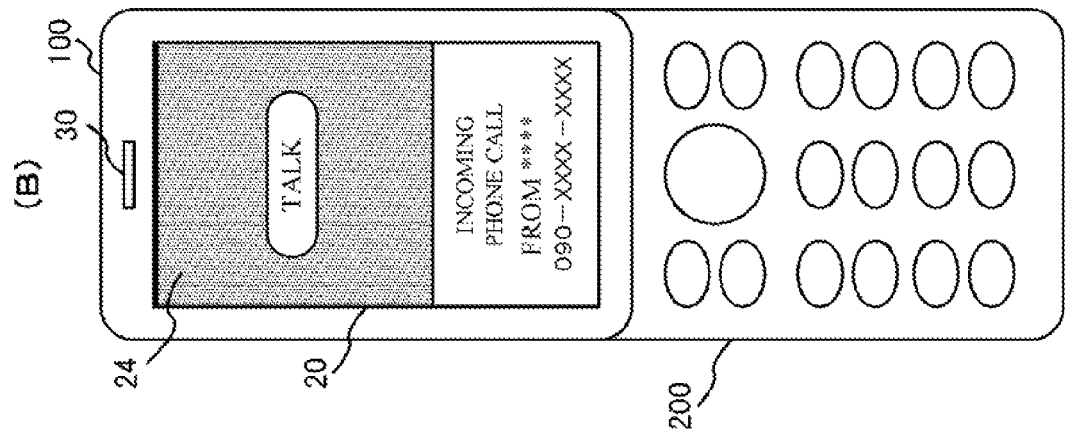
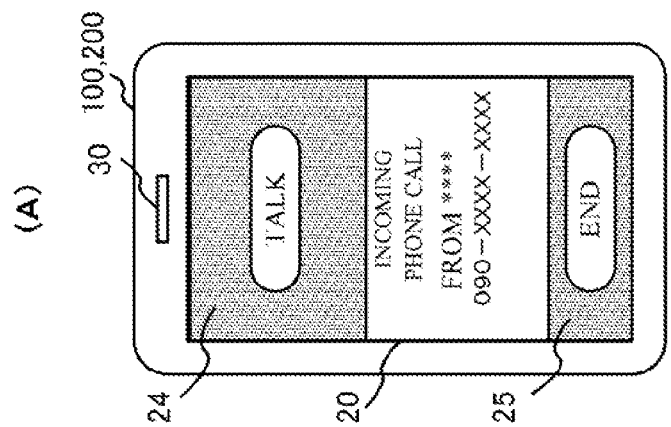

INFORMATION PROCESSING APPARATUS

This application is the National Phase of PCT/JP2009/005532, filed Oct. 22, 2009, which is based upon and claims the benefit of priority from Japanese Application No. 2008-275068 filed on Oct. 27, 2008 and Japanese Application No. 2008-275705 filed on Oct. 27, 2008, the disclosures of which are incorporated herein in its entirety by reference.

TECHNICAL FIELD

The present invention relates to an information processing apparatus, and in particular, to an information processing apparatus having a touch panel installed therein.

BACKGROUND ART

As an input/output interface of an information processing apparatus, there is, for example, a touch panel device which displays various operation sections by display switching, and which enables a predetermined operation input by touching the displayed operation sections. Recently, this type of touch panel device is often installed in a mobile phone. The touch panel is used as a display screen, and is also used as the operation sections. This improves usability while increasing the size of the display screen with the advancement of multifunction.

However, in the information processing apparatus having the touch panel installed therein, an operator may unintentionally touch the operation sections displayed on the touch panel, causing an erroneous operation. For example, the mobile phone is brought near the face during talk, and therefore, the body such as the face may come in contact with the touch panel. In that occasion, there arises the problem that the unnecessary operation button is unintentionally operated in the middle of the talk, causing an erroneous operation. Also in the information processing apparatus having the touch installed therein, the operation is performed on the screen where key positions are unfixed. Therefore, upon receipt of an incoming phone call during the touch panel operation, the display screen is changed into an incoming phone call screen and, at the same time, an unintentional situation may occur during an input operation. As the result, the operator might reply to the incoming phone call by an erroneous operation.

Regarding the above problem, in the communication terminal device disclosed in patent document 1, in order to prevent the erroneous operation during talk, an input enabled range to enable input during talk is set to a part of a touch panel. Therefore, no input is enabled except for the input enabled range during talk, thereby suppressing the erroneous operation.

Patent documents 2 and 3 disclose phone terminals having a touch panel installed therein which is adapted to uniformly avoid the operator's erroneous operation by nullifying the operator's operation during a predetermined period of time, when an incoming phone call occurs.

Patent document 1: Japanese Unexamined Patent Application Publication No. 2000-349886
Patent document 2: Japanese Unexamined Patent Application Publication No. 2005-203930
Patent document 3: Japanese Unexamined Patent Application Publication No. 2007-235676

SUMMARY OF THE INVENTION

In the technique described in the patent document 1, however, the input enabled range is set only during talk in the mobile phone having the touch panel installed therein, thus failing to suppress the erroneous operation during other operation state. This problem may occur not only in the mobile phone, but also in every information processing apparatus having a touch panel installed therein.

In the techniques described in the patent documents 2 and 3, the operator's erroneous operation is uniformly avoided. Upon receipt of the incoming phone call, the operator's operation is nullified for the predetermined period of time irrespective of the operating state of the operator. Notwithstanding, no consideration is given to the following operator usability, and hence the operator convenience might be lowered. Additionally, in the operation requiring quick input operation, or the like, the operator suffers inconvenience of poor operating efficiency.

Therefore, an exemplary object of the present invention is to prevent the occurrence of erroneous operation and the deterioration of usability in the information processing apparatus having the touch panel installed therein.

An information processing apparatus according to an exemplary embodiment of the present invention includes: a touch panel for displaying predetermined information and accepting a touch operation input; and a control section for controlling operation of the information processing apparatus itself having the touch panel installed therein. The control section includes: a processing occurrence detection means for detecting occurrence of a predetermined processing executed by the control section; and a panel control means for nullifying a touch operation input against the touch panel when the occurrence of the predetermined processing is detected by the processing occurrence detection means. The panel control means cancels nullification of the touch operation input against the touch panel after an elapse of a preset time from the occurrence of the predetermined processing, and sets, in association with the occurred predetermined processing, a touch operation input acceptable range allowing the touch panel to accept the touch operation input with respect to the predetermined processing.

A computer program according to other exemplary embodiment of the present invention is executed on an information processing apparatus including: a touch panel for displaying predetermined information and accepting a touch operation input; and a control section for controlling operation of an information processing apparatus itself having the touch panel installed therein. The computer program causes the control section to implement a processing occurrence detection means for detecting occurrence of a predetermined processing executed by the control section; and a panel control means for nullifying a touch operation input against the touch panel when the occurrence of the predetermined processing is detected by the processing occurrence detection means. The panel control means installed into an information processing terminal using the computer program cancels nullification of the touch operation input against the touch panel after an elapse of a preset time from the occurrence of the predetermined processing, and sets, in association with the occurred predetermined processing, a touch operation input acceptable range allowing the touch panel to accept the touch operation input with respect to the predetermined processing.

An information processing method according to other exemplary embodiment of the present invention is executed on an information processing apparatus including: a touch panel for displaying predetermined information and accepting a touch operation input; and a control section for controlling operation of an information processing apparatus itself having the touch panel installed therein. The information processing method includes: detecting occurrence of a predetermined processing executed by the control section; nullifying a touch operation input against the touch panel upon detection of the occurrence of the predetermined processing; canceling nullification of the touch operation input against the touch panel after an elapse of a preset time from the occurrence of the predetermined processing; and settings, in association with the occurred predetermined processing, a touch operation input acceptable range allowing the touch panel to accept the touch operation input with respect to the predetermined processing.

The present invention thus configured effectively suppresses the erroneous operation in the information processing apparatus having the touch panel installed therein, and also improves operator convenience.

BRIEF DESCRIPTION OF THE DRAWINGS

FIG. 9 is a diagram showing an example of postures and an example of displays in a mobile phone in a second exemplary embodiment, respectively;

EXEMPLARY EMBODIMENTS

First Exemplary Embodiment

Figure 1:
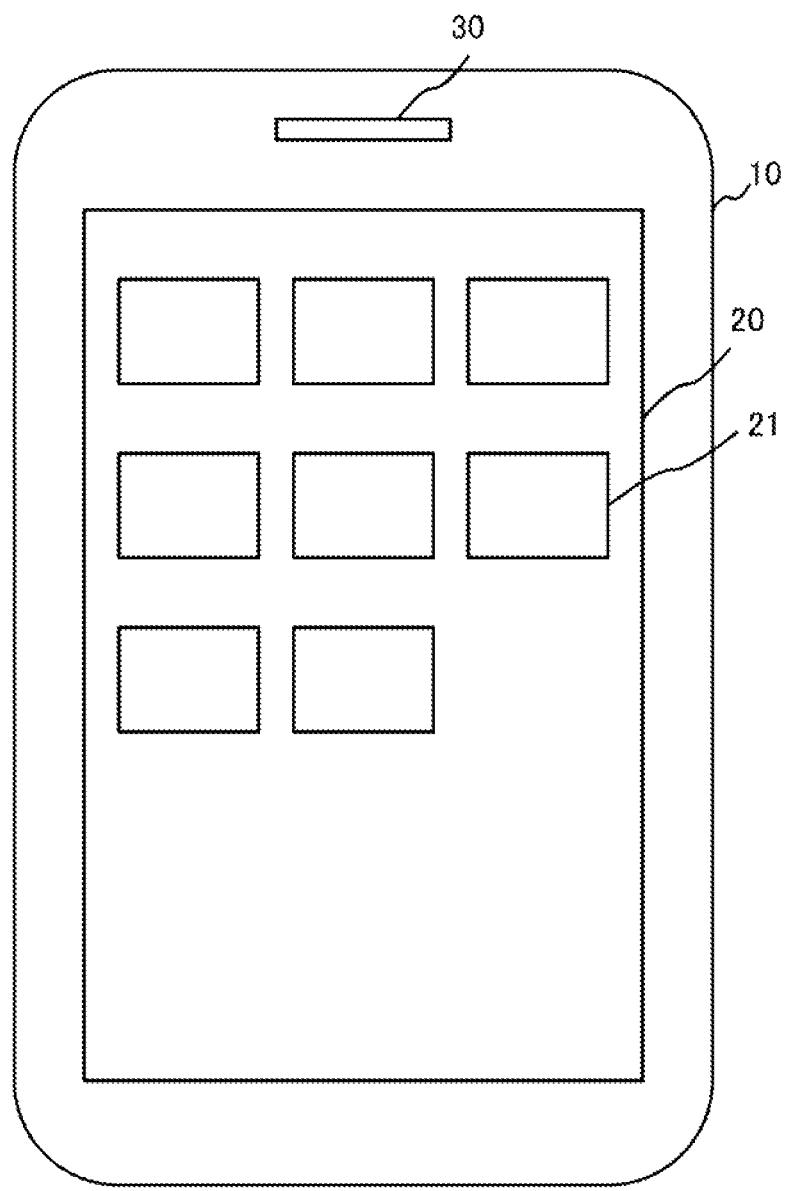
FIG. 1 is a diagram showing external appearance and configuration of a mobile phone in a first exemplary embodiment.
Figure 2:
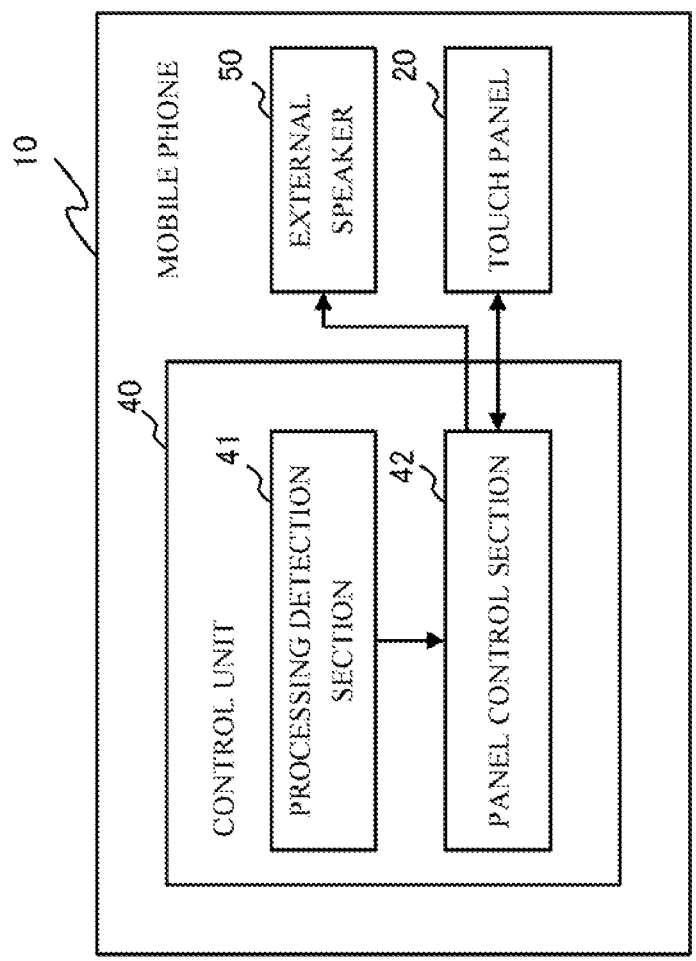
FIG. 2 is a functional block diagram showing an internal configuration of the mobile phone in the first exemplary embodiment.
Figure 3:
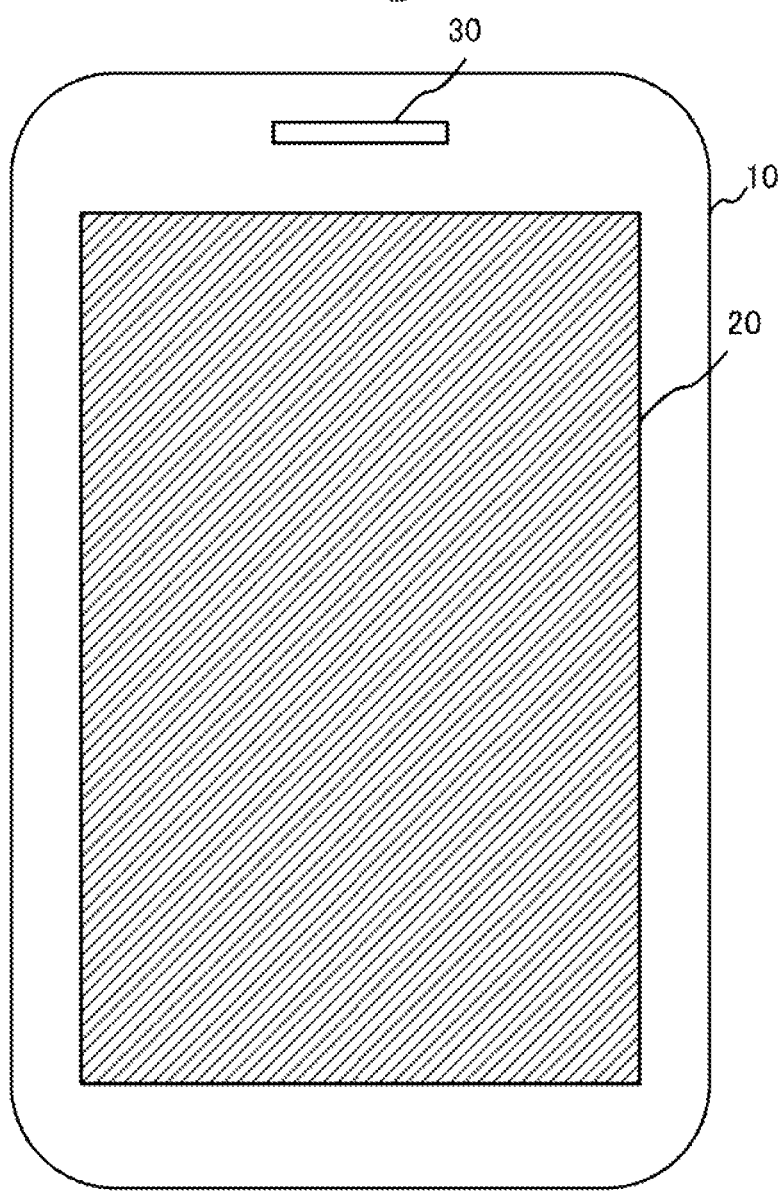
FIG. 3 is a diagram showing display an example in a touch panel installed in the mobile phone in the first exemplary embodiment.
Figure 7:
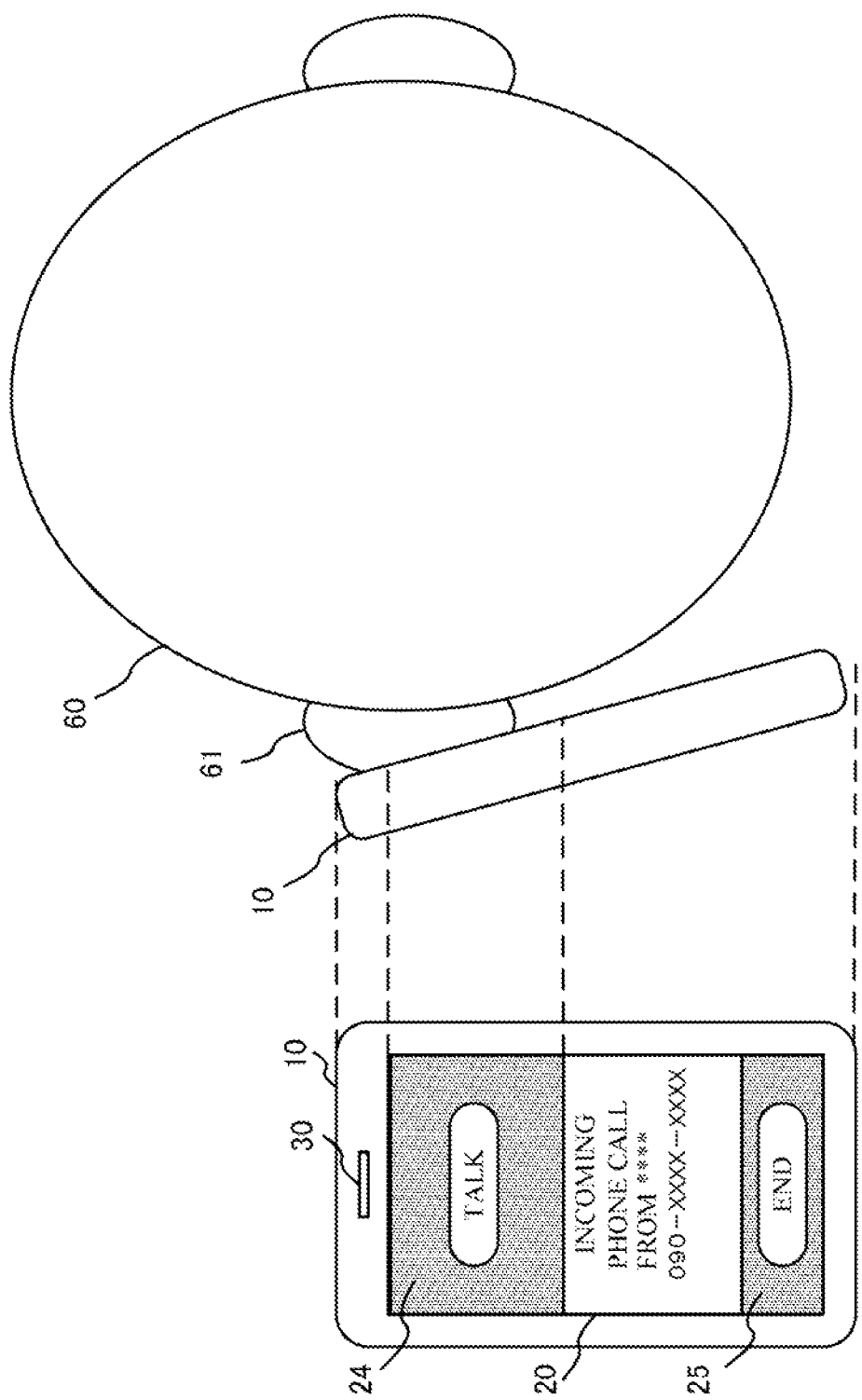
FIG. 7 is a diagram showing an example of use of the mobile phone in the first exemplary embodiment.
Figure 8:
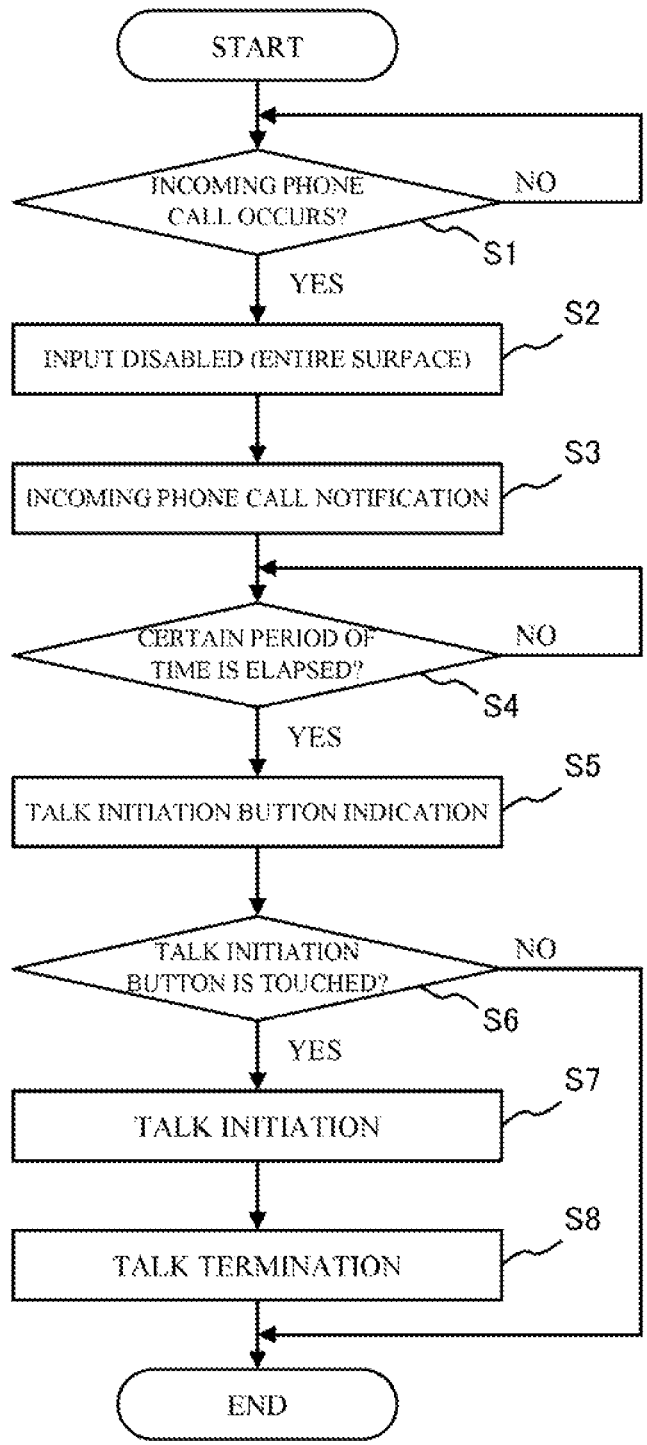
FIG. 8 is a flow chart showing the operation of the mobile phone in the first exemplary embodiment.

The first exemplary embodiment of the present invention is described with reference to FIGS. 1 to 8. FIG. 1 is the diagram showing the external appearance and configuration of the mobile phone. FIG. 2 is the functional block diagram showing the internal configuration of the mobile phone. FIGS. 3 to 6 are the diagrams showing the display examples in the mobile phone. FIG. 7 is the diagram showing the example of use of the mobile phone. FIG. 8 is the flow chart showing the operation of the mobile phone.

The present exemplary embodiment illustrates the mobile phone as an information processing apparatus having the touch panel installed therein. It is to be understood that the information processing apparatus of the present invention is not limited to the mobile phone, and it may be a mobile information processing terminal such as a PDA (personal digital assistant) or a portable game machine, or, alternatively, a fixed type information processing apparatus, without being limited to the portable type.

<Configuration>

As shown in FIG. 1, the mobile phone 10 in the present exemplary embodiment includes a substantially rectangular casing having a predetermined thickness, and has the touch panel 20 on a surface of the casing. The touch panel 20 functions as a display device for displaying predetermined information, and also functions as an input device for accepting touch operation input against the panel surface. As shown in FIG. 1, the touch panel 20 displays, for example, various icons 21 as operation button indications. By pressing a stylus pen or the operator's finger against the display location of one of the icons 21, the touch panel 20 detects the touch operation input that indicates selection of that icon 21.

The mobile phone 10 also has a speaker 30 for outputting receiving sound, on the surface of the casing. Specifically, the speaker 30 is installed in a mid-portion on one end side in the longitudinal direction of the substantially rectangular casing (the upper end side in FIG. 1). The operator usually holds the location of the speaker 30 to the operator's ear during talk. The mobile phone 10 further includes a microphone for capturing sending sound that is the operator's voice, which is not shown, and the description thereto is omitted here.

As shown in the functional block diagram of FIG. 2, the mobile phone 10 includes therein a control unit 40 which performs phone call processing, and display processing and input processing against the touch panel 20, and which controls operation of the mobile phone 10 itself. The mobile phone 10 further includes an external speaker 50 for outputting an incoming phone call notification sound and operating sound to the exterior.

The control unit 40 includes a processing detection 41 and a panel control section 42 which are configured by installing computer program according to the present invention.

The processing detection section 41 (processing occurrence detection means) has a function of detecting occurrence of a predetermined processing executed by the control unit 40. The term "predetermined processing" detected by the processing detection section 41 means "incoming phone call processing" in the present exemplary embodiment. Specifically, the "incoming phone call processing" means the processing of notifying the operator of an incoming phone call by receiving a flag signal sent by an outgoing phone call from other mobile phone through an external transmitter such as a wireless base station. Upon detection of the incoming phone call, the processing detection section 41 notifies the panel control section 42 of the occurrence of the incoming phone call, and the contents thereof (the phone number of the sending side, and the like).

Upon receipt of the notification of occurrence of the incoming phone call processing as described above, the panel control section 42 (panel control means) nullifies the touch operation input against the touch panel 20. Even upon detection of touch operation input against the touch panel 20, the input contents thereof are not accepted. That is, the panel control section 42 does not accept and nullifies the touch operation input over the entire surface of the touch panel 20, as shown by the crosshatched range in FIG. 3.

The panel control section 42 continues the nullification of the touch operation input against the touch panel 20 for a predetermined period of time. That is, upon detection of the incoming phone call, the panel control section 42 allows the touch panel 20 to enter a disabled status for approximately one or two seconds. In other words, the panel control section 42 nullifies the operation against the touch panel 20 for a certain period of time after detecting the incoming phone call, and thereafter, cancels an invalid status, and enables the touch operation input against the touch panel 20. The certain period of time when the operation of the touch panel 20 is nullified is measured by, for example, a timer circuit installed in the mobile phone 10. A short period of time such as one or two seconds described above is preset as the certain period of time to nullify the operation.

Figure 4:
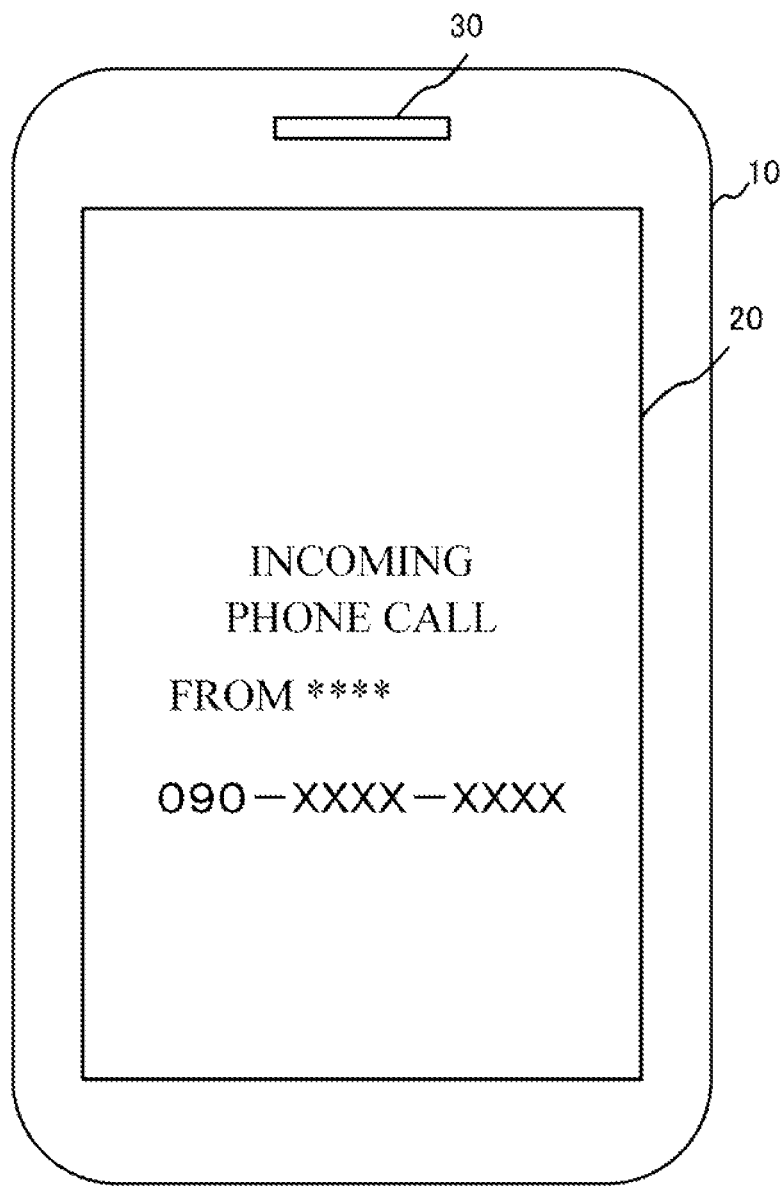
FIG. 4 is a diagram showing display an example in a touch panel installed in the mobile phone in the first exemplary embodiment.

Upon detection of the incoming phone call, the panel control section 42 erases the operation button indications that have been displayed on the touch panel 20 until that time. That is, the panel control section 42 nullifies the touch operation input as described above, and entirely inhibits display of the operation button indications that can be visually recognized as being input enabled. At the same time, the panel control section 42 also displays, upon detection of the incoming phone call, information to notify the occurrence of the incoming phone call on the touch panel 20. For example, as shown in FIG. 4, it displays an indication of "incoming phone call", the phone number "090-XXXX-XXXX" of a sender, and an indication of the sender name "****" stored in phonebook data in the mobile phone 10. Further, at the same time, the panel control section 42 controls so that the external speaker 50 outputs an incoming phone call notification sound. On that occasion, however, the incoming phone call notification sound is not outputted when the mobile phone 10 is set to a silent mode in which no incoming phone call notification sound is outputted even upon detection of the incoming phone call in the mobile phone 10. On the other hand, when the mobile phone 10 is set to cause the incoming phone call notification by means of vibrations, the panel control section 42 also controls so that vibrations are generated by a vibrator (not shown) installed in the mobile phone 10, in addition to the incoming phone call indication as described above. Thus, the panel control section 42 outputs the notification information to notify the incoming phone call to the exterior by the preset notification means.

Figure 5:
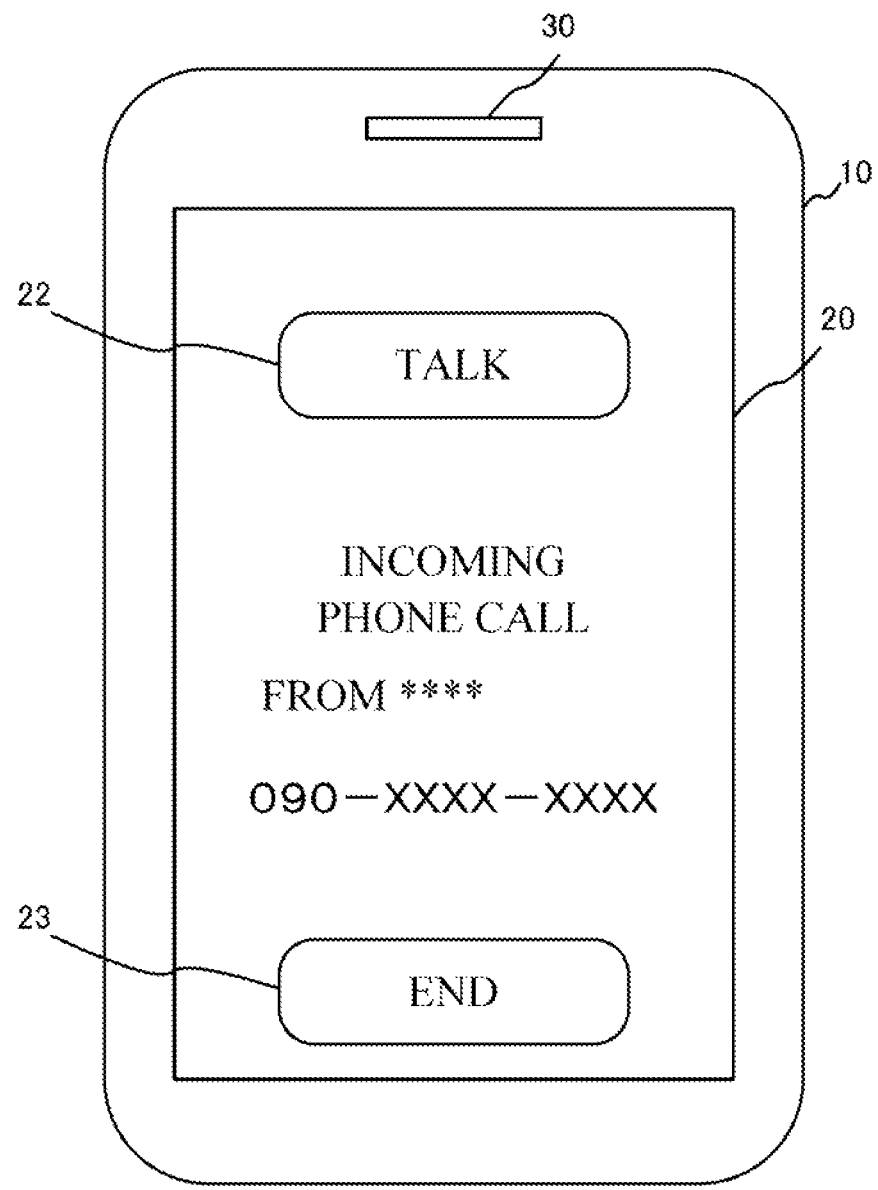
FIG. 5 is a diagram showing display an example in a touch panel installed in the mobile phone in the first exemplary embodiment.

Upon cancellation of the invalid status of the touch panel 20 after the elapse of the certain period of time from the incoming phone call detection, as described above, the panel control section 42 displays, on the touch panel 20, the operation button indications that can accept operation input with respect to the incoming phone call notification processing. Specifically, as the processing with respect to the incoming phone call, a "talk" button indication 22 to enable the touch operation input to instruct talk initiation, and an "end" button indication 23 that enables the touch operation input to instruct talk rejection or hold, as shown in FIG. 5. On that occasion, the invalid status of the touch operation input against the touch panel 20 is canceled, and therefore, the "talk" operation is inputted upon the operator's touch against the "talk" button indication 22, and the mobile phone 10 enters a talk status. When the operator touches the "end" button indication 23, the "end" operation is inputted, and the mobile phone 10 rejects and disconnect the talk, or enters a talk-hold status.

On that occasion, the panel control section 42 displays the "talk" button indication 22 on one end side in the longitudinal direction of the substantially rectangular touch panel (corresponding to a mid-portion in the short side direction and one end side in the long side direction). This is particularly displayed on the one end side on which the speaker 30 for outputting the incoming phone call sound is disposed, in the example of FIG. 5. That is, the "talk" button indication 22 is displayed at the location with which the operator's ear may contact, upon entering the talk status.

Figure 6:
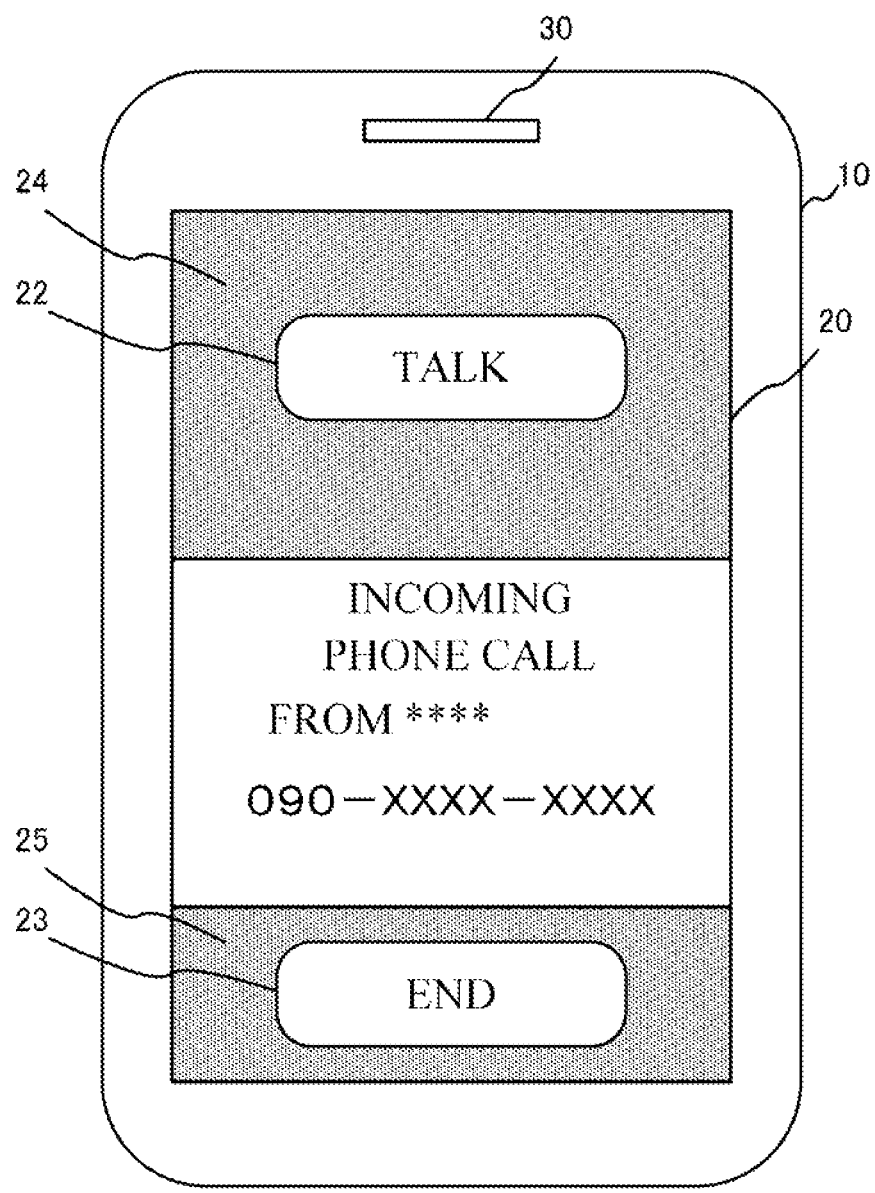
FIG. 6 is a diagram showing display an example in a touch panel installed in the mobile phone in the first exemplary embodiment.

The panel control section 42 further sets a range around the "talk" button indication 22, namely, a predetermined range on one end side as indicated by a shaded range 24 in FIG. 6, as a range for detecting the touch operation input to instruct the "talk initiation" (touch operation input acceptable range). Specifically, as shown in FIG. 6, the panel control section 42 sets the range 24, which extends in the longitudinal direction from the end of the touch panel 20 adjacent to the speaker 30, and covers approximately one-third of the touch panel 20, so as to function as the "talk" button. Upon detection of a touch operation input against the shaded range 24 set around the "talk" button indication 22, the panel control section 42 accepts the touch operation input as input to instruct the "talk initiation." Then, the mobile phone 10 enters the talk status.

A shaded range 25 formed around the "end" button indication 23, as shown in FIG. 6, functions similarly to the "end" button indication 23. That is, upon detection of a touch operation input against the shaded range 25 set around the "end" button indication 23, the panel control section 42 accepts the touch operation input as input to instruct "talk termination."

Although in FIG. 6, the ranges 24 and 25 that enable the touch operation input to instruct the "talk initiation" and the "talk termination," respectively, are illustrated by shading, the shaded display for indicating these ranges 24 and 25 is not actually executed. In order to indicate the ranges that enable the touch operation input, graphics or information display, such as the shading as shown in FIG. 6, may be executed in these ranges.

As described above, the operator 60 usually puts the operator's ear 61 or cheek against the side of the touch panel 20 on which the speaker 30 for outputting the receiving sound is disposed, as shown in FIG. 7. As the result, the periphery of the speaker 30 contacts with the ear 61 or cheek. Here, on the side on which the speaker 30 is disposed, the range 24 that enables the touch operation input for the "talk initiation" is made larger than the "talk" button indication 22 so as to extend from one side to the other side of the touch panel 20, as described above. This increases the probability that the ear 61 of the operator 60 will be contacted with the range 24. Upon actual contact of the ear 61 of the operator 60 with the range 24, the touch operation input for the "talk initiation" is executed automatically, and the panel control section 42 of the mobile phone 10 detects this input. Thus, the operator 60 can smoothly start talking by making a motion to start talking.

In the foregoing FIG. 6, the "talk" button 22 and the "end" button 23 are displayed after the invalid status for the operations of the touch panel 20 is canceled after the elapse of the certain period of time from the incoming phone call detection, these buttons 22 and 23 may not be displayed. Also in this case, the operator makes a motion to talk upon occurrence of the incoming phone call, as shown in FIG. 7, so that the ear 61 contacts smoothly with the range 24 that enables the touch operation input for the "talk initiation," allowing the operator to smoothly start talking.

While the foregoing illustrates the case where the ranges 24 and 25 that enable the touch operation input are set at the positions and in the areas on the touch panel 20, as shown in FIG. 6, after releasing the invalid status for the operation of the touch panel 20, these ranges 24 and 25 are set in association with the processing occurred in the mobile phone 10. For example, in the foregoing example, the mobile phone 10 is set to previously store setting data so that the ranges 24 and 25 to enable the touch operation input are respectively set at the positions and in the areas as described above, upon detection of the "incoming phone call" in the mobile phone 10. Hence, upon detection of other interrupt processing, such as an incoming email message, the mobile phone 10 enters an operation invalid status for a certain period of time. After releasing the operation invalid status, a touch operation input enabled range having position and area preset in association with "incoming email message processing" is set to the touch panel 20. Consequently, the touch operation input enabled range can be set at easy-to-operate position and range in association with a processing occurred, thereby improving usability.

The operation of the mobile phone 10 during the incoming phone call is described with reference to the flow chart of FIG. 8.

Firstly, when other mobile phone sends an outgoing phone call to the mobile phone 10, an incoming phone call processing occurs in the mobile phone 10 upon receipt of a call from a wireless base station. Then, the mobile phone 10 detects the incoming phone call processing (YES in step S1, namely, the processing occurrence detection step), and notifies the panel controller 42 of the detection.

Immediately after detecting the incoming phone call processing, the mobile hone 10 nullifies the touch operation input against the touch panel 20 (step S2, namely, the panel control step). Specifically, regardless of which portion of the touch panel 20 is to detect the touch operation input, the input content is not accepted. That is, as shown by the crosshatched range in FIG. 3, the touch operation input is not accepted and nullified over the entire surface of the touch panel 20. When operation button indications and the like operated by the operator are displayed immediately therebefore on the touch panel 20, the mobile phone 10 erases these operation button indications and the like.

The mobile phone 10 nullifies the touch operation input against the touch panel 20 and, at the same time, displays the incoming phone call notification, and the sender's information such as the sender's name and phone number, as shown in FIG. 4. That is, the mobile phone 10 visually notifies the operator of the incoming phone call (step S3). According to the setting of the incoming phone call notification, the mobile phone 10 further performs the incoming phone call notification by another method, for example, by outputting incoming phone call notification sound, or by allowing the casing thereof to vibrate, or by lighting up a lamp. During this period, the touch operation input against the touch panel 20 remains invalid.

After an elapse of a certain period of time (for example, one or two seconds) from the detection of the incoming phone call, the mobile phone 10 enables acceptance of the touch operation input against the touch panel 20. In other words, the input from the touch panel 20 becomes invalid for the preset certain period of time from the detection of the incoming phone call, and thereafter returns to the original status to enable input from the touch panel 20, as described above.

Upon cancellation of the nullification of input against the touch panel 20, the mobile phone 10 displays the "talk" button indication 22 that is the operation button indication to instruct "talk initiation" on the touch panel 20 (step S5). Specifically, this is displayed in the vicinity of the one end in the longitudinal direction of the rectangular touch panel 20, namely, the one end on which the speaker 30 is disposed, as shown in FIG. 5. The mobile phone 10 also displays the "end" button indication 23 in the vicinity of the other end in the longitudinal direction of the touch panel 20, which is located opposite the one end, as shown in FIG. 5.

Thereafter, the mobile phone 10 accepts the input of the "talk" operation upon touch against the "talk" button indication 22 by the operator's finger or the like (YES in step S6).

The mobile phone 10 then enters the talk status (step S7). The talk is terminated when one of the operators performs the operation to terminate the talk (step S8). When the operator touches the "end" button indication 23, the mobile phone 10 rejects and disconnects the talk, or enters the talk hold status.

When displaying the "talk" button indication 22 in step S5 after cancelling the nullification of the input to the touch panel 20, the mobile phone 10 also sets the periphery of the "talk" button indication 22 as the range 24 that enables the touch operation input to instruct the talk initiation. Then, upon detection of a touch operation input against the range 24 extended approximately one-third of the touch panel 20, from the end thereof adjacent to the speaker 30 to the mid-portion thereof in the longitudinal direction, as shown in FIG. 6, the mobile phone 10 accepts the input as the input to instruct the "talk initiation." Therefore, upon the operator's touch operation input against the periphery of the "talk" button indication 22, the mobile phone 10 enters a talk initiation status.

Here it is exemplarily assumed that when the operator 60 recognizes the incoming phone call by the incoming phone call notification outputted from the mobile phone 10 as shown in step S3, the operator 60 holds the mobile phone 10 and moves it toward the ear in order to immediately start talking, as shown in FIG. 7. In this case, the operator 60 usually holds the side of the touch panel 20, on which the speaker 30 for outputting receiving sound is disposed, to the ear 61, as shown in FIG. 7. Although immediately after the incoming phone call is detected, the touch panel of the mobile phone 10 is in an input disabled status, the input disabled status of the touch panel 20 is canceled in one or two seconds corresponding to the elapsed time until reaching the ear. As described above, the range 24 that enables the touch operation input for "talk initiation" is formed on the side of the touch panel 20 on which the speaker is disposed. Consequently, the ear 61 or cheek of the operator 60 contacts smoothly with the range 24. Thus, the mobile phone 10 accepts the touch operation input for "talk initiation" and enters the talk status.

The display positions and dimensions of the "talk" button indication 22, and the range 24 set to the periphery thereof, which enables the touch operation input to instruct the talk initiation, are preset in association with the occurred incoming phone call processing. The setting data thereof are stored, for example, in a storage unit in the mobile phone 10. The setting data are referred to upon detection of a predetermined processing such as the incoming phone call processing, and the individual button indications and the touch operation enabled range are set according to the setting.

According to the mobile phone 10 in the present exemplary embodiment, the touch operation input against the touch panel 20 becomes invalid immediately after the occurrence of the incoming phone call processing or the like. Therefore, even when the incoming phone call occurs while the operator performs an input operation against the touch panel 20, and the operator continues the input operation, the input to the touch panel becomes invalid and is not accepted. This suppresses the erroneous operation of the mobile phone 10.

Additionally, by setting a certain range on the touch panel 20, against which the operator may touch when making a motion to talk, so as to enable the touch operation input for the talk initiation, the operator can start talking with a natural motion, thereby improving the operator's convenience.

Although the foregoing exemplarily illustrates the case where the detection of the occurrence of the incoming phone call in the mobile phone 10 corresponds to the timing of nullification of the touch operation input against the touch panel 20, the timing of nullification of the touch operation input against the touch panel 20 is not limited thereto. For example, also when there occurs an interrupt processing that is executed interruptedly even during execution of other processing in the mobile phone 10, it may be configured so that the panel control section 42 operates similarly. That is, when the interrupt processing occurs, the mobile phone 10 detects the occurrence of the interrupt processing, and immediately thereafter nullifies the input to the touch panel 20 for a certain period of time. After the certain period of time, the mobile phone 10 cancels the nullification of the input to the touch panel 20, and enables again the input to the touch panel 20, thereby displaying a touch operation button indication set in association with the interrupt processing.

Hereat, one example of the interrupt processing is described. Firstly, similarly to the incoming phone call processing, there occurs a data receiving processing of an email message sent from a wireless base station or wireless LAN base station. In this case, upon receipt of data such as email message, the incoming email notification indication and email confirmation operation indication are executed on the touch panel 20 of the mobile phone 10. By nullifying the input to the touch panel 20 at that time, an unintentional operation input can be suppressed. Besides the email message, the case of receiving local information sent from a transmitter installed at any optional location by short-distance wireless communication such as RFID (radio frequency identification) tag is also regarded as an example of the interrupt processing.

Examples of the interrupt processing include processing executed at a certain time specified within the mobile phone 10. For example, there is an alarm function of schedule software which displays schedule information indicating a preset schedule on the touch panel 20 at a predetermined time. Also in this case, even when the schedule information are suddenly displayed on the touch panel 20, an unintentional operation input can be suppressed by nullifying the input to the touch panel 20 as described above.

Thus, in the present invention, even when a suddenly executed processing occurs irrespective of the operator's operation in the mobile phone 10, immediately thereafter, the touch operation input against the touch panel 20 is nullified, thereby suppressing the erroneous operation.

Second Exemplary Embodiment

A second exemplary embodiment of the present invention is next described with reference to FIG. 9, which is the diagram showing an example of postures and displays in a mobile phone.

The mobile phone shown in FIG. 9 includes two substantially identical quasi-rectangular casings 100 and 200, as shown in FIG. 9(B). As shown in FIG. 9(A), in the mobile phone, these two casings 100 and 200 are slidably connected to each other so as to be shifted from a state where these two casings overlap each other, as shown in FIG. 9(A), to a state where they are mutually moved in a longitudinal direction, as shown in FIG. 9(B).

The internal configuration installed in the mobile phone shown in FIGS. 9(A) and 9(B) is substantially similar to that of the foregoing first exemplary embodiment. Therefore, upon detection of an incoming phone call in the state in FIG. 9(A), the touch operation input against the touch panel 20 is similarly nullified for a certain period of time. Thereafter, the nullification of the input to the touch panel 20 is canceled, and the talk button indication and end button indication are displayed. On that occasion, the range 24 around the talk button indication is set to accept the touch operation input for "talk initiation." The range 25 around the end button indication is set to accept the touch operation input for "talk termination."

The panel control section 42 of the mobile phone 10 in the present exemplary embodiment further includes a function of detecting the posture of these casings 100 and 200, and a function of changing and displaying the area of the range 24 that enables the touch operation input for "talk initiation" (the touch operation input acceptable range) set on the touch panel 20, according to the detected posture. For example, as shown in FIG. 9(B), when detected that the mobile phone 10 is slid into an open state, the end of the touch panel 20 on which the speaker 30 is disposed, namely, an approximately half or more of the touch panel 20 away from a connection section between the casings is set as the range 24 for accepting the touch operation input of the "talk initiation." For example, the posture of the mobile phone 10 itself may be detected by the following method. That is, magnets are installed in the casings 100 and 200, respectively. The magnetic force of one casing is detected by the other casing, thereby detecting the relative position between the casings 100 and 200. The posture detection is not limited to this method, and various other known techniques may be employed.

When detected that the mobile phone 10 is slid into the open state, the operator assumes a posture in which the greater part of the touch panel 20 are contacted with the ear or cheek during talk. In response to the operator's movement, the range 24 to accept the touch operation input for "talk initiation" during the open state of the mobile phone 10 is set to be larger than that during the closed state thereof. This increases the probability that the operator's ear or cheek will be contacted with the range 24. Upon actual contact of the operator's ear with the range 24, the touch operation input for "talk initiation" is executed automatically, and the panel control section 42 of the mobile phone 10 detects this input. Thus, the operator can smoothly start talking by making a motion to start talking.

Although the example shown in FIG. 9(B) illustrates the case where the area of the range 24 to accept the touch operation input for "talk initiation" is changed according to the posture of the mobile phone 10, the area is optionally changed, and is preset for each posture of the mobile phone 10. The foregoing method for sliding the mobile phone 10 is described merely by way of example, and is not limited to that the two casings are slidingly opened and closed. The present invention is also not limited to applying to the mobile phone including two casings.

Third Exemplary Example

Figure 10:
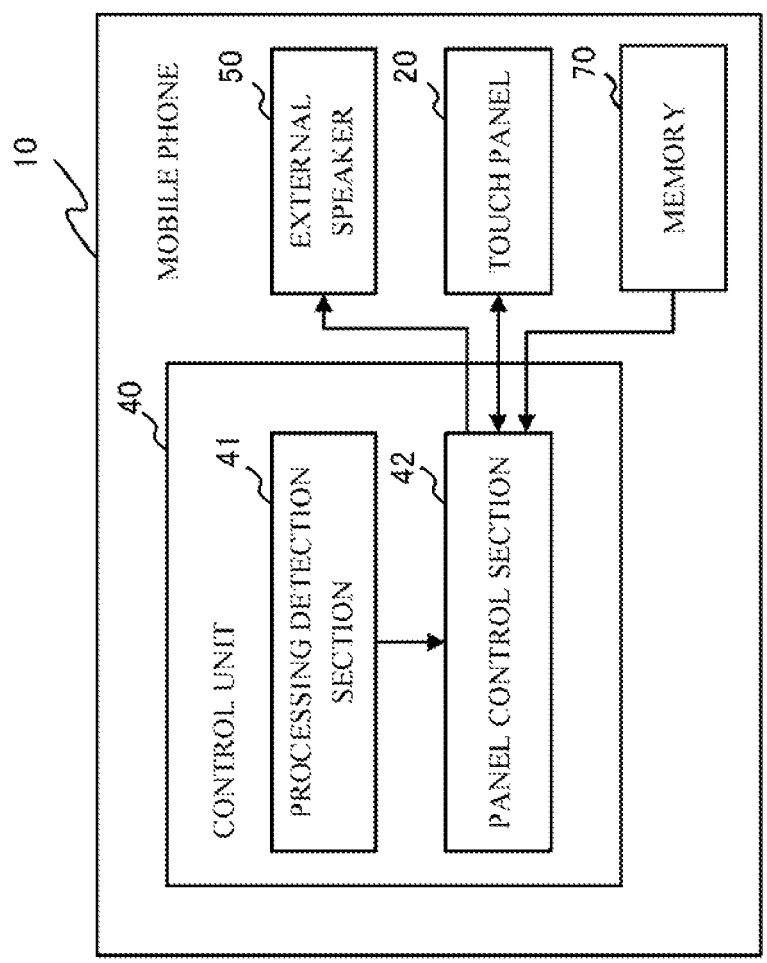
FIG. 10 is a functional block diagram showing an internal configuration of a mobile phone in a third exemplary embodiment.
Figure 11:
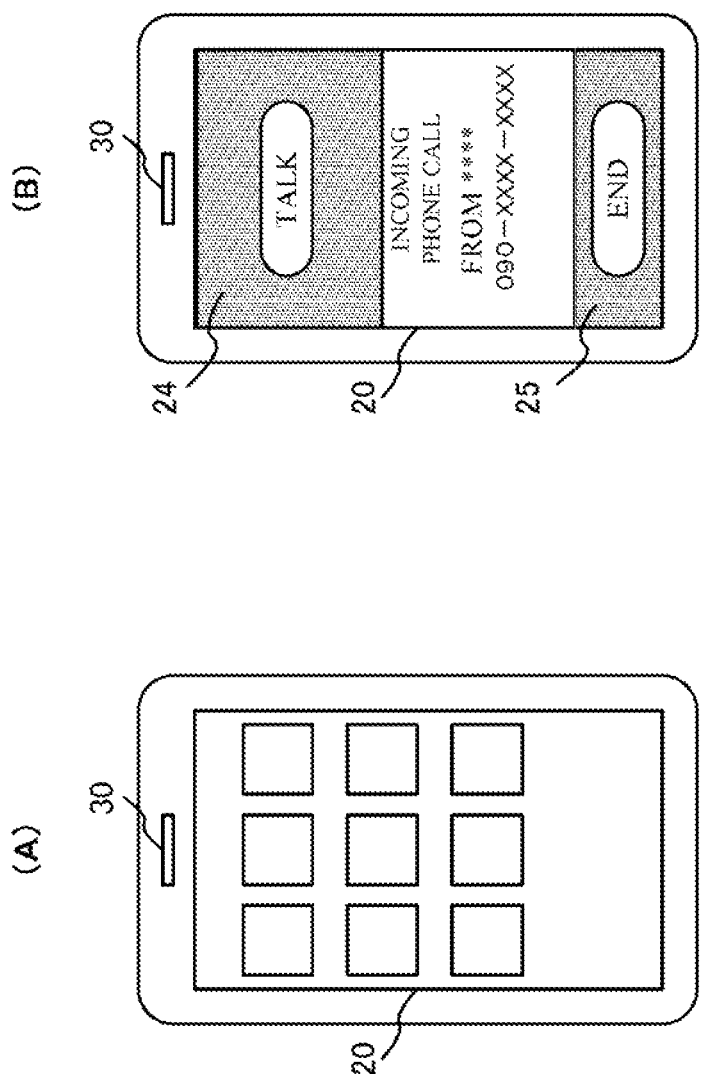
FIG. 11 is a diagram showing display examples in a touch panel installed in the mobile phone in the third exemplary embodiment.
Figure 12:
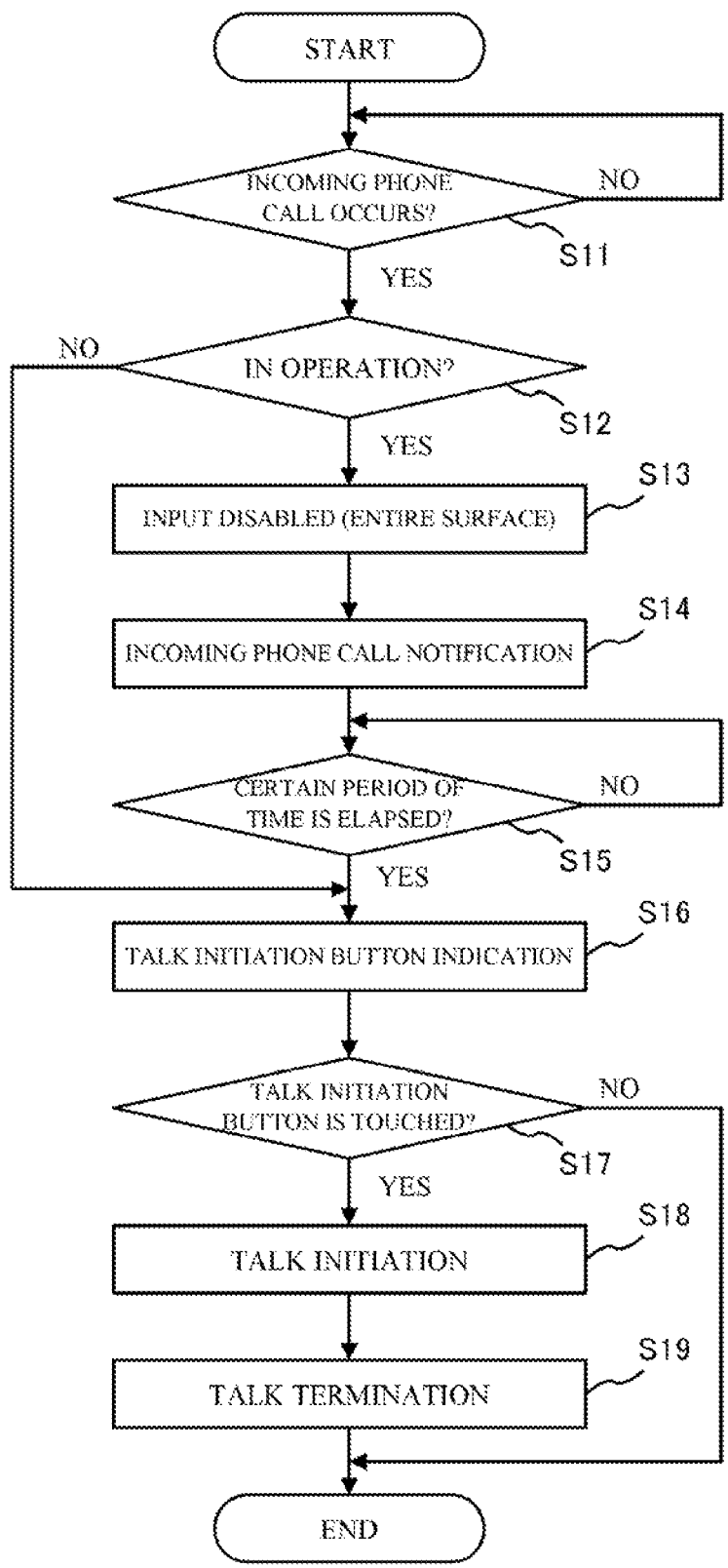
FIGS. 12 and 13 are flow charts showing the operation of the mobile phone in the third exemplary embodiment.
Figure 13:
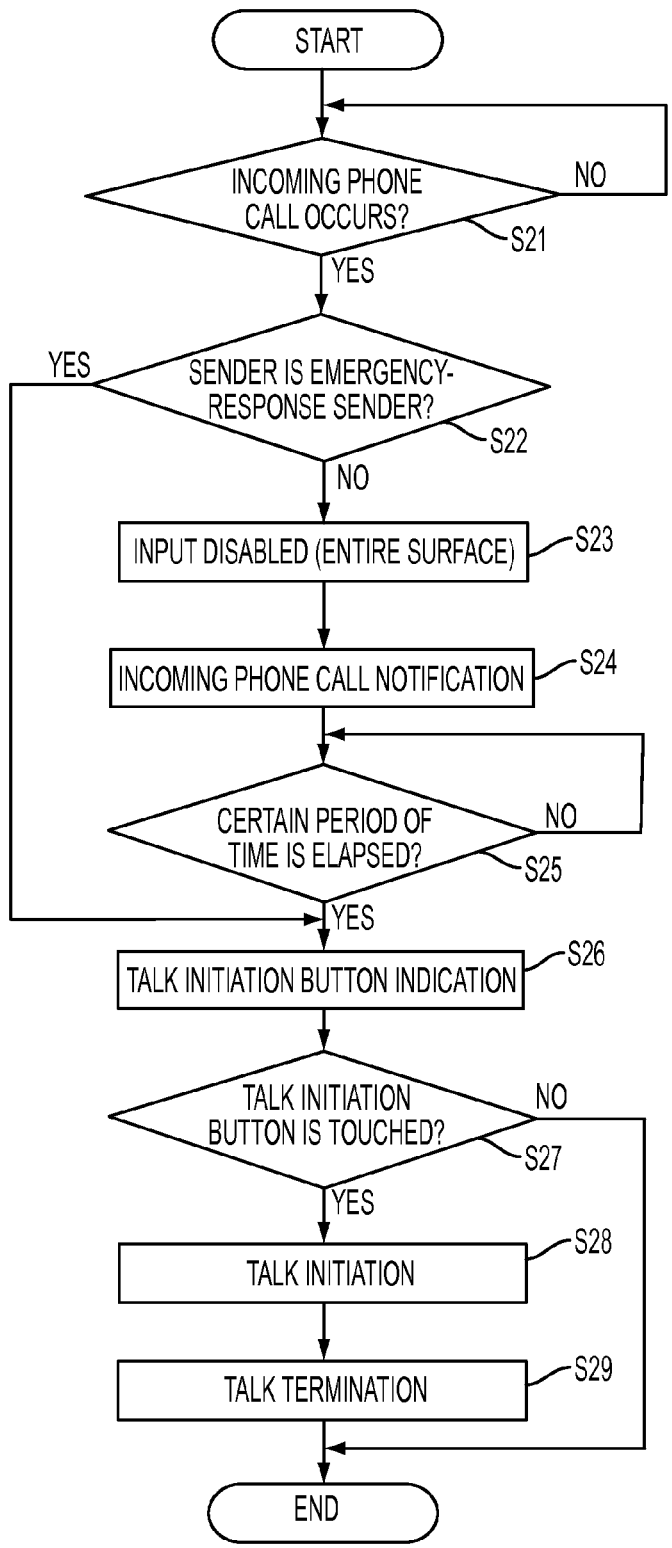

A third exemplary embodiment of the present invention is next described with reference to FIGS. 10 to 13. FIG. 10 is the functional block diagram showing the configuration of a mobile phone. FIG. 11 is the diagram showing an example of displays in the mobile phone. FIGS. 12 and 13 are the flow charts showing the operation of the mobile phone.

<Configuration>

The mobile phone 10 in the present exemplary embodiment has a configuration substantially similar to those of the mobile phones 10 in the foregoing first and second exemplary embodiments. The mobile phone 10 of the present exemplary embodiment has a function of retaining the validity of the touch operation input against a touch panel 20 without nullifying the operation against the touch panel 20 for the certain period of time as described above, as long as a certain condition is fulfilled, even when detected the occurrence of predetermined processing such as an incoming phone call. The corresponding configuration is described below in detail.

A panel control section 42 of the mobile phone 10 in the present exemplary embodiment has the following function. That is, upon detection of an interrupt processing such as an incoming phone call, the panel control section 42 firstly determines whether the touch panel is in operation or not by detecting touch operational situations against the touch panel 20. Specifically, the panel control section 42 firstly stores and retains the presence or absence of the touch operation input against the touch panel 20 usually for a period of time (for example, for one second) that corresponds to a preset period of time preceding the current time. Upon detection of a predetermined processing, the panel control section 42 inspects whether the touch operation input has been executed or not against the touch panel 20 for the period of time that is counted from the detection time to the passed preset time (for example, for one second before detecting the occurrence of processing). The panel control section 42 determines that the touch panel 20 is in operation if the touch operation input is confirmed during this time period, whereas it determines that the touch panel is not in operation if no touch operation input is confirmed.

Similarly to the foregoing first exemplary embodiment, while the touch panel 20 is in operation, the panel control section 42 preferentially displays the occurrence of a predetermined processing, such as an incoming phone call, on the touch panel 20 for a certain period of time (for example, 400 to 600 msec) that is counted from the occurrence of the predetermined processing, such as the incoming phone call, by a timer circuit, and also nullifies the touch operation input against the touch panel 20. After the certain period of time, the panel control section 42 cancels the nullification of the touch operation input against the touch panel 20, and changes the display of the touch panel 20 so as to enable the touch operation input to instruct talk initiation with respect to the incoming phone call that is the occurred processing. For example, as shown in FIG. 11(B), the panel control section 42 displays various types of button indications such as a "talk" button indication, and sets touch operation input-enabled ranges 24 and 25.

On the other hand, if determined that the touch panel 20 is not in operation upon detection of the predetermined processing, the panel control section 42 retains the validity of the touch operation input against the touch panel 20, without nullifying the touch operation input against the touch panel 20. That is, unless the touch panel 20 is in operation upon detection of the predetermined processing such as the incoming phone call, the touch operation input against the touch panel 20 remains enabled even immediately thereafter.

Accordingly, when the incoming phone call is received before the operator operates the touch panel 20, the input operation by the operator is enabled immediately after receipt of an incoming phone call notification, without nullifying the touch operation input against the touch panel 20. This allows the operator to perform a quick response to the incoming phone call notification.

The mobile phone 10 of the present exemplary embodiment stores, in a memory 70 as a storage unit installed therein, address data such as user names and their phone numbers, who may become a plurality of different senders from whom the operator may receive an incoming phone call notification. Among the address data in the memory 70, the data of users preset as emergency-response users are stored in the memory 70 (sender-side storage means) set as emergency-response sender data.

In relation thereto, upon detection of occurrence of an incoming phone call processing, the panel control section 42 acquires sender information (telephone number and the like) contained in the information sent from a base station received during the incoming phone call, and inspects whether the sender information are stored as the emergency-response sender data in the memory 70. Similarly to the foregoing first exemplary embodiment, if determined that the sender is not the emergency-response sender, the panel control section 42 preferentially displays the occurrence of a predetermined processing, such as an incoming phone call, on the touch panel 20 for a certain period of time from the occurrence of the predetermined processing such as the incoming phone call, and also nullifies the touch operation input against the touch panel 20. After the certain period of time, the panel control section 42 cancels the nullification of the touch operation input against the touch panel 20, and changes the display on the touch panel 20 so as to enable the touch operation input to instruct talk initiation with respect to the incoming phone call that is the occurred processing.

On the other hand, if determined that the sender is the emergency-response sender, the panel control section 42 retains the validity of the touch operation input against the touch panel 20, without nullifying that, as described above. That is, unless the touch panel 20 is in operation upon detection of the predetermined processing such as the incoming phone call, the touch operation input against the touch panel 20 remains enabled even immediately thereafter.

Thus, when the sender is preset as one who requires the emergency-response, the validity of the touch operation input against the touch panel 20 remains enabled without being subjected to nullification. That is, even immediately after the occurrence of the predetermined processing, the mobile phone is operated to accept the touch operation input against the touch panel. This allows the operator to perform a quick input to the information processing apparatus according to circumstances, thereby further improving the operator convenience.

<Operation>

The operation upon receipt of an incoming phone call in the mobile phone 10 in the present exemplary embodiment is described below with reference to the flow chart in FIG. 12 or 13, and the example of displays in the mobile phone of FIG. 11. The description of the operation similar to that of the foregoing first exemplary embodiment is omitted here.

Firstly, when the mobile phone 10 detects an incoming phone call processing from other mobile phone (YES in step S11), the mobile phone 10 inspects touch operation input situations against the touch panel 20. For example, it determines whether the touch panel 20 is in operation or not by inspecting the operation situations during a predetermined period of time passed before the detection of the incoming phone call processing (step S12).

If determined that the touch panel 20 is in operation (YES in step S12), similarly to the foregoing first exemplary embodiment, the mobile phone 10 nullifies the touch operation input against the touch panel 20 for a certain period of time (step S13) and, at the same time, notifies the operator of the incoming phone call (step S14) by displaying the incoming phone call notification, and sender information, such as the sender name and telephone number, on the touch panel 20, or by outputting incoming phone call notification sound from the external speaker 50. During this period, of course, the touch operation input against the touch panel 20 remains invalid.

After an elapse of a certain period of time (for example, one or two seconds) from the detection of the incoming phone call (YES in step S15), the mobile phone 10 cancels the nullification of the input to the touch panel 20, and enables acceptance of the touch operation input against the touch panel 20.

Specifically, the mobile phone 10 displays the "talk" button indication 22 that is the operation button indication to instruct "talk initiation" on the touch panel 20, and also sets the "talk" button indication 22 and the periphery thereof, as the range 24 that enables the touch operation input to instruct talk initiation (step S16). Thereafter, the mobile phone 10 accepts the input of the "talk" operation by the operator's finger touch or the like against the "talk" button indication 22 or the input enabled range 24 (YES in step S17). The mobile phone 10 then enters the talk status (step S18). The talk is terminated when one of the operators performs the operation to terminate the talk (step S19).

On the other hand, if determined that touch panel 20 is not in operation upon detection of the incoming phone call (NO in step S12), the mobile phone 10 holds the validity of the touch operation input against the touch panel 20, without nullifying the touch operation input against the touch panel 20. For example, under the condition that the incoming phone call is detected while a predetermined screen is displayed on the touch panel 20, as shown in FIG. 11(A), the mobile phone 10 displays the "talk" button indication 22 on the touch panel 20, as shown in FIG. 11(B), so that when the touch panel 20 is not in operation, the touch operation input against the touch panel 20 is enabled immediately thereafter. The mobile phone 10 also sets the "talk" button indication 22 and the periphery thereof, as the range 24 that enables the touch operation input to instruct talk initiation (step S16).

Then, the mobile phone 10 accepts the "talk" operation input by the operator's finger touch or the like against the "talk" button indication 22 or the input enabled range 24 (YES in step S17). Thereby, the mobile phone 10 enters the talk status (step S18). The talk is terminated when one of the operators performs the operation to terminate the talk (step S19).

Thus, when the incoming phone call is received before the operator operates the touch panel 20, the operator can perform input operation immediately after receipt of the incoming phone call notification. This allows the operator to perform a quick response to the incoming phone call notification.

Next, other operations of the mobile phone 10 are described with reference to FIG. 13. Firstly, upon detection of an incoming phone call from other mobile phone (YES in step S21), the mobile phone 10 inspects whether the sender is recorded or not in the memory 70 as the emergency-response sender (step S22).

If determined that the sender is not the emergency-response sender (NO in step S22), similarly to the foregoing first exemplary embodiment, the mobile phone nullifies the touch operation input against the touch panel 20 for a certain period of time and, at the same time, notifies the operator of the incoming phone call (step S24) by displaying the incoming phone call notification, and the sender information, such as the sender name and telephone number, on the touch panel 20, or by outputting incoming phone call notification sound from the external speaker 50. During this period, of course, the touch operation input against the touch panel 20 remains invalid.

After an elapse of a certain period of time (for example, one or two seconds) from the detection of the incoming phone call (YES in step S25), the mobile phone 10 cancels the nullification of the input to the touch panel 20, and enables acceptance of the touch operation input against the touch panel 20. Specifically, the mobile phone 10 displays the "talk" button indication 22 that is the operation button indication to instruct the "talk initiation" on the touch panel 20, and also sets the "talk" button indication 22 and the periphery thereof as the range 24 that enables the touch operation input to instruct talk initiation (step S26). Thereafter, the mobile phone 10 accepts the input of the "talk" operation by the operator's finger touch or the like on the "talk" button indication 22 or the input enabled range 24 (YES in step S27). The mobile phone 10 then enters the talk status (step S28). The talk is terminated when one of the operators performs the operation to terminate the talk (step S29).

On the other hand, if determined that the sender is the emergency-response sender (YES in step S22), the mobile phone 10 holds the validity of the touch operation input against the touch panel 20, without nullifying the touch operation input against the touch panel 20. For example, under the conditions that the incoming phone call is detected while a predetermined screen is displayed on the touch panel 20, as shown in FIG. 11(A); and that the sender is the emergency-response sender, the mobile phone 10 displays the "talk" button indication 22 on the touch panel 20, as shown in FIG. 11(B), so that when the sender is the emergency-response sender, the touch operation input against the touch panel 20 is enabled immediately thereafter. The mobile phone 10 also sets the "talk" button indication 22 and the periphery thereof, as the range 24 that enables the touch operation input to instruct talk initiation (step S26).

Then, the mobile phone 10 accepts the "talk" operation input by the operator's finger touch or the like against the "talk" button indication 22 or the input enabled range 24 (YES in step S27). Thereby, the mobile phone 10 enters the talk status (step S28). The talk is terminated when one of the operators performs the operation to terminate the talk (step S29).

Thus, when the sender is preset as the emergency-response sender, the touch operation input against the touch panel is not nullified, but is held valid. That is, immediately after the occurrence of the predetermined processing, the mobile phone operates to accept the touch operation input against the touch panel. This allows the operator to perform a quick input to the information processing apparatus according to circumstances, thereby further improving the operator convenience.

Fourth Exemplary Embodiment

Figure 14:
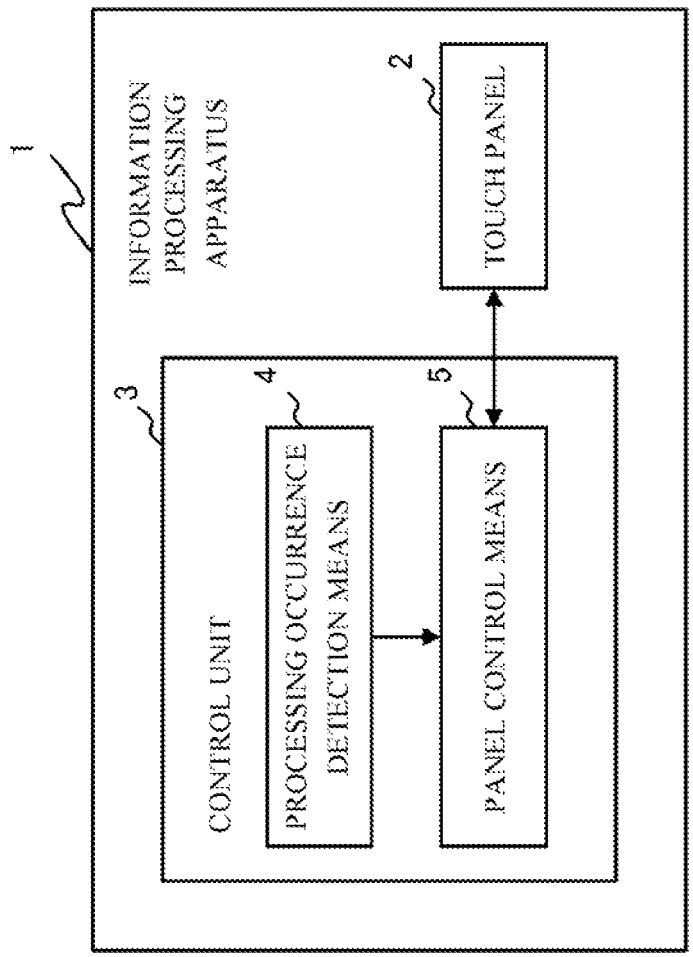
FIG. 14 is a block diagram showing the outline of configuration of a mobile phone in a fourth exemplary embodiment.

A fourth exemplary embodiment of the present invention is described with reference to FIG. 14. FIG. 14 is the functional block diagram showing the configuration of an information processing apparatus in the present exemplary embodiment. The information processing apparatus in the present exemplary embodiment includes the foregoing mobile phone, and the configuration thereof is omitted here.

As shown in FIG. 14, an information processing apparatus 1 in the present exemplary embodiment includes: a touch panel 2 for displaying predetermined information and accepting a touch operation input; and a control section 3 for controlling operation of the information processing apparatus 1 having the touch panel 2 installed therein. The information processing apparatus may employ the following configuration.

The control section 3 includes: a processing occurrence detection means 4 for detecting occurrence of a predetermined processing executed by the control section 3; and a panel control means 5 for nullifying a touch operation input against the touch panel when the occurrence of the predetermined processing is detected by the processing occurrence detection means 4.

The panel control means 5 cancels nullification of the touch operation input against the touch panel 2 after an elapse of a preset time from the occurrence of the predetermined processing, and sets, in association with the occurred predetermined processing, a touch operation input acceptable range allowing the touch panel 2 to accept the touch operation input with respect to the predetermined processing.

The information processing apparatus may also employ the following configuration. The information processing apparatus further includes a plurality of casings. The panel control means sets an area of the touch operation input acceptable range to the touch panel by changing the area according to a posture of the information processing apparatus itself established by mutual movement between the casings.

The information processing apparatus may also employ the following configuration. The processing occurrence detection means detects, as the predetermined processing, an incoming phone call processing occurred in the information processing apparatus upon receipt of send information sent from an external transmitter. The panel control means cancels nullification of the touch operation input against the touch panel after an elapse of a preset time from the occurrence of the incoming phone call processing, and sets the touch operation input acceptable range for accepting a touch operation input to create an instruction of talk initiation, on one end side in a longitudinal direction of the touch panel having a substantially rectangular shape.

The information processing apparatus may also employ the following configuration. The panel control means cancels nullification of the touch operation input against the touch panel after an elapse of a preset time from the occurrence of the incoming phone call processing, and displays a talk initiation operation button indication for accepting a touch operation input to create an instruction of talk initiation, on one end side in a longitudinal direction of the touch panel having a substantially rectangular shape.

The information processing apparatus may also employ the following configuration. One end side in the longitudinal direction of the touch panel corresponds to an end side of the touch panel located adjacent to a speaker installed in the information processing apparatus and outputting receiving sound during talk.

According to the foregoing invention, upon occurrence of the predetermined processing executed by the control section, the information processing apparatus detects it, and nullifies the touch operation input against the touch panel for the certain time. Even when the operator performs an input operation against the touch panel before the occurrence of the predetermined processing, and the operation button indication on the touch panel is changed due to the occurrence of the predetermined processing, the input to the touch panel is nullified and not accepted. This suppresses the erroneous operation from the touch panel to the information processing apparatus. After the certain period of time, the input against the touch panel is enabled, thereby enhancing the operator convenience. On that occasion, the operator convenience is further enhanced by performing the following operations correspondingly to the occurred predetermined processing, namely, by setting the range to enable the touch operation input with respect to the predetermined processing on the touch panel, or by displaying operation button indications, or by changing the area of the range to enable the touch operation input against the touch panel according to the posture of the information processing apparatus. Particularly, the talk initiation operation of the operator is facilitated by setting so that the talk initiation operation input is detected in a certain range of the touch panel against which the operator's ear or cheek may be abutted during talk.

In the foregoing information processing apparatus, when the processing occurrence detection means detects the occurrence of the predetermined processing, the panel control means may nullify the touch operation input against the touch panel over the entire surface of the touch panel. Owing to the nullification of the input over the entire surface of the touch panel upon occurrence of the predetermined processing, the erroneous operation is more surely suppressed because no input is accepted regardless of which portion of the touch panel is to be touched by the operator.

In the information processing apparatus, when the processing occurrence detection means detects the occurrence of the predetermined processing, the panel control means may erase the operation button indications to enable acceptance of the touch operation input displayed on the touch panel before the occurrence of the predetermined processing. In an alternative, when the processing occurrence detection means detects the occurrence of the predetermined processing, the panel control means may output notification information to notify the occurrence of the predetermined processing to the exterior. In an alternative, when the processing occurrence detection means detects the occurrence of the predetermined processing, the panel control means may display notification information to notify the occurrence of the predetermined processing on the touch panel. In an alternative, the panel control means may detect an interrupt processing executed by the control section, even while a different processing is executed as the predetermined processing.

Thus, upon occurrence of the predetermined processing, the information processing apparatus erases the operation button indications operated by the operator at that time, or outputs the information to notify the occurrence of the predetermined processing on the touch panel. Therefore, the operator recognizes the occurrence of the predetermined processing and, thereafter, may discontinue useless touch operation input against the touch panel, thereby suppressing the erroneous operation of the information processing apparatus.

The information processing apparatus may also employ the following configuration. The panel control means determines, upon occurrence of the predetermined processing, whether the touch panel is in operation or not by detecting touch operation situations on the touch panel, and retains validity of the touch operation input against the touch panel when the touch panel is not in operation.

The information processing apparatus may also employ the following configuration. The information processing apparatus further includes a sender storing means for storing, as an emergency-response sender, information of a sender preset as one who requires emergency-response, among information indicating a plurality of senders from whom it is expected to receive an incoming phone call notification. The processing occurrence detection means detects, as the predetermined processing, an incoming phone call processing occurred when the information processing apparatus receives send information sent from an external transmitter. The panel control means determines, upon detection of occurrence of the incoming phone call processing, whether a sender contained in the received send information is stored or not in the sender storing means as the emergency-response sender, and retains validity of the touch operation input against the touch panel when the sender is the emergency-response sender.

According to the foregoing configuration, when the touch panel is not in operation, or when the sender is preset as one who requires emergency-response, the touch operation input against the touch panel is not nullified, but is held valid. That is, immediately after the occurrence of the predetermined processing, the mobile phone operates to accept the touch operation input against the touch panel. This allows the operator to perform a quick input to the information processing apparatus according to circumstances, thereby further improving the operator convenience.

The foregoing information processing apparatus is implemented by incorporating a computer program into the information processing apparatus. Specifically, the computer program according to other exemplary embodiment of the present invention is executed on an information processing apparatus including: a touch panel for displaying predetermined information and accepting a touch operation input; and a control section for controlling operation of an information processing apparatus itself having the touch panel installed therein. The computer program causes the control section to implement a processing occurrence detection means for detecting occurrence of a predetermined processing executed by the control section; and a panel control means for nullifying a touch operation input against the touch panel when the occurrence of the predetermined processing is detected by the processing occurrence detection means. The panel control means cancels nullification of the touch operation input against the touch panel after an elapse of a preset time from the occurrence of the predetermined processing, and sets, in association with the occurred predetermined processing, a touch operation input acceptable range allowing the touch panel to accept the touch operation input with respect to the predetermined processing.

The computer program may employ the following configuration. When the information processing apparatus includes a plurality of casings, the panel control means sets an area of the touch operation input acceptable range to the touch panel by changing the area according to a posture of the information processing apparatus itself established by mutual movement between the casings.

An information processing method according to other exemplary embodiment of the present invention is executed upon operation of an information processing apparatus including: a touch panel for displaying predetermined information and accepting a touch operation input; and a control section for controlling operation of an information processing apparatus itself having the touch panel installed therein. The information processing method includes: detecting occurrence of a predetermined processing executed by the control section; nullifying a touch operation input against the touch panel upon detection of the occurrence of the predetermined processing, canceling nullification of the touch operation input against the touch panel after an elapse of a preset time from the occurrence of the predetermined processing; and settings, in association with the occurred predetermined processing, a touch operation input acceptable range allowing the touch panel to accept the touch operation input with respect to the predetermined processing.

The information processing method may employ the following configuration. When setting the touch operation input acceptable range onto the touch panel in the information processing apparatus including a plurality of casings, the information processing method includes setting an area of the touch operation input acceptable range to the touch panel by changing the area according to a posture of the information processing apparatus itself established by mutual movement between the casings.

The information processing method may employ the following configuration. When detected, as the predetermined processing, an incoming phone call processing occurred in the information processing apparatus upon receipt of send information sent from an external transmitter, the information processing method includes: canceling nullification of the touch operation input against the touch panel after an elapse of a preset time from the occurrence of the incoming phone call processing; and setting the touch operation input acceptable range for accepting a touch operation input to create an instruction of talk initiation, on one end side in a longitudinal direction of the touch panel having a substantially rectangular shape.

The information processing method may employ the following configuration. The information processing method includes, upon occurrence of the predetermined processing, determining whether the touch panel is in operation or not by detecting touch operation situations on the touch panel; and retaining validity of the touch operation input against the touch panel when the touch panel is not in operation.

The information processing method may employ the following configuration. The information processing method includes: detecting, as the predetermined processing, an incoming phone call processing occurred in the information processing apparatus upon receipt of send information sent from an external transmitter; upon detection of occurrence of the incoming phone call processing, determining whether a sender contained in the received send information is stored or not in the information processing apparatus as an emergency-response sender preset as one who requires emergency-response; and retaining validity of the touch operation input against the touch panel when the sender is the emergency-response sender.

The inventions of the computer programs or information processing methods, which have the foregoing configuration, also have the operation similar to the information processing apparatus, thereby achieving the exemplary object of the present invention as previously described.

The foregoing computer program is stored in a storage medium, such as a CD-ROM, and is provided through a predetermined computer to the information processing apparatus connected to the computer by a cable or the like. In an alternative, the computer program may be stored in a storage unit of a different server computer over a network, and is provided from the server computer to the information processing apparatus through the network.

While the present invention has been described herein with reference to the foregoing exemplary embodiments, it is to be understood that the present invention is not limited thereto. Numerous changes and modifications which can be understood by those skilled in the art may be made in the configurations and details of the present invention within the scope of the present invention.

The present invention is applicable to portable phones, PDAs, portable game machines, as well as every information processing apparatus having a touch panel installed therein, such as fixed mobile phone terminals. Hence, the present invention has industrial applicability.

The invention claimed is:

1. An information processing apparatus, comprising:
a touch panel for displaying predetermined information and accepting a touch operation input; and
a control section for controlling operation of the information processing apparatus itself having the touch panel installed therein, the control section comprising:
a processing occurrence detection unit for detecting an occurrence of an incoming phone call processing as a predetermined processing executed by the control section; and
a panel control unit for nullifying a touch operation input against the touch panel when the occurrence of the incoming phone call processing is detected by the processing occurrence detection unit,
a sender storing unit for storing, as an emergency-response sender, information of a sender preset as one who requires an emergency-response, among information indicating a plurality of senders from whom an incoming phone call notification is expected to be received, the processing occurrence detection unit detects that the incoming phone call processing occurred when the information processing apparatus receives send information sent from an external transmitter, wherein the panel control unit:
cancels a nullification of the touch operation input against the touch panel after an elapse of a preset time from the occurrence of the incoming phone call processing;
sets, in association with the occurred incoming phone call processing, a touch operation input acceptable range allowing the touch panel to accept the touch operation input with respect to the incoming phone call processing, and thereby invalidates the input from the touch panel for the preset certain period of time from the detection of the incoming phone call, and thereafter returns to the original status to enable input from the touch panel, and
determines, upon the detection of the occurrence of the incoming phone call processing, whether a sender contained in the received send information is stored or not in the sender storing unit as the emergency-response sender, and retains a validity of the touch operation input against the touch panel when the sender is stored as the emergency response sender.

2. The information processing apparatus according to claim 1, further comprising a plurality of casings, wherein the panel control unit sets an area of the touch operation input acceptable range to the touch panel by changing the area according to a posture of the information processing apparatus itself established by mutual movement between the casings.

3. The information processing apparatus according to claim 1,
the panel control unit sets the touch operation input acceptable range for accepting the touch operation input to create an instruction of talk initiation, on one end side in a longitudinal direction of the touch panel having a substantially rectangular shape.

4. The information processing apparatus according to claim 3, wherein
the panel control unit cancels the nullification of the touch operation input against the touch panel after an elapse of the preset time from the occurrence of the incoming phone call processing, and displays a talk initiation operation button indication for accepting a touch operation input to create an instruction of talk initiation, on one end side in a longitudinal direction of the touch panel having a substantially rectangular shape.

5. The information processing apparatus according to claim 3, wherein
one end side in the longitudinal direction of the touch panel corresponds to an end side of the touch panel located adjacent to a speaker, which is installed in the information processing apparatus and configured to output a received sound during talk.

6. The information processing apparatus according to claim 1, wherein
the panel control unit determines, upon an occurrence of the incoming phone call processing, whether the touch panel is in operation or not by detecting a touch operation situation on the touch panel, and retains a validity of the touch operation input against the touch panel when the touch panel is not in operation.

7. A non-transitory computer-readable storage medium storing a computer program executed on an information processing apparatus comprising: a touch panel for displaying predetermined information and accepting a touch operation input; and a control section for controlling operation of an information processing apparatus itself having the touch panel installed therein, the computer program causing the control section to implement a processing occurrence detection unit for detecting occurrence of an incoming phone call processing as a predetermined processing executed by the control section; a panel control unit for nullifying a touch operation input against the touch panel when the occurrence of the incoming phone call processing is detected by the processing occurrence detection unit; and a sender storing unit for storing, as an emergency-response sender, information of a sender preset as one who requires an emergency-response, among information indicating a plurality of senders from whom an incoming phone call notification is expected to be received, the processing occurrence detection unit detects that the incoming phone call processing occurred when the information processing apparatus receives send information sent from external transmitter, wherein the panel control unit:
cancels a nullification of the touch operation input against the touch panel after an elapse of a preset time from the occurrence of the incoming phone call processing,
sets, in association with the occurred incoming phone call processing, a touch operation input acceptable range allowing the touch panel to accept the touch operation input with respect to the incoming phone call processing, and thereby invalidates the input from the touch panel for the preset certain period of time from the detection of the incoming phone call, and thereafter returns to the original status to enable input from the touch panel, and
determines, upon the detection of the occurrence of the incoming phone call processing, whether a sender contained in the received send information is stored or not in the sender storing unit as the emergency-response sender, and retains a validity of the touch operation input against the touch panel when the sender is the emergency response sender.

8. The non-transitory computer-readable storage medium storing the computer program according to claim 7, wherein when the information processing apparatus includes a plurality of casings, the panel control unit sets an area of the touch operation input acceptable range to the touch panel by changing the area according to a posture of the information processing apparatus itself established by mutual movement between the casings.

9. An information processing method executed on an information processing apparatus comprising a touch panel for displaying predetermined information and accepting a touch operation input, and a control section for controlling operation of an information processing apparatus itself having the touch panel installed therein, the information processing method comprising:
detecting an occurrence of an incoming phone call processing as a predetermined processing executed by the control section;
nullifying a touch operation input against the touch panel upon the detection of the occurrence of the incoming phone call processing;

storing, as an emergency-response sender, information of a sender preset as one who requires an emergency-response, among information indicating a plurality of senders from whom an incoming phone call notification is expected to be received, the incoming phone call processing is detected as having occurred when the information processing apparatus receives send information sent from an external transmitter;

canceling the nullification of the touch operation input against the touch panel after an elapse of a preset time from the occurrence of the incoming phone call processing;

setting, in association with the occurred incoming phone call processing, a touch operation input acceptable range allowing the touch panel to accept the touch operation input with respect to the incoming phone call processing, thereby invalidating the input from the touch panel for the preset certain period of time from the detection of the incoming phone call, and thereafter returning to the original status to enable input from the touch panel; and determining, upon the detection of the occurrence of the incoming phone call processing, whether a sender contained in the received send information is stored as the emergency-response sender, and in response to determining that the sender is store as the emergency-response sender, retaining a validity of the touch operation input against the touch panel.

10. The information processing method according to claim 9, wherein, when setting the touch operation input acceptable range onto the touch panel in the information processing apparatus comprising a plurality of casings, the information processing method further comprises setting an area of the touch operation input acceptable range to the touch panel by changing the area according to a posture of the information processing apparatus itself established by mutual movement between the casings.

11. The information processing method according to claim 9,
   wherein setting the touch operation input for allowing the touch patent to accept the touch input operation input includes setting an acceptable range for accepting the touch operation input to create an instruction of talk initiation, on one end side in a longitudinal direction of the touch panel having a substantially rectangular shape.

12. The information processing method according to claim 9, further comprising, upon occurrence of the incoming phone call processing:
   determining whether the touch panel is in operation or not by detecting a touch operation situation on the touch panel; and
   retaining a validity of the touch operation input against the touch panel when the touch panel is not in operation.

* * * * *